3,135,660
METHOD FOR PURIFYING SULFATED CARBOHYDRATES WITH OXIDIZING AGENTS
Jess A. Bush, Long Beach, Leon D. Freeman, Sherman Oaks, and Elliot B. Hagerty, Lafayette, Calif., assignors to Riker Laboratories, Inc., Northridge, Calif., a corporation of Delaware
No Drawing. Original application Nov. 9, 1956, Ser. No. 621,217. Divided and this application Feb. 13, 1961, Ser. No. 88,599
5 Claims. (Cl. 167—74)

This invention relates to the purification of sulfated carbohydrates and has particular reference to a method for decolorizing heparin solutions and for the removal of pyrogens therefrom.

Heparin produced by most commercial methods is often very highly colored in aqueous solution and this coloration is disadvantageous from the standpoint of selling heparin for medical purposes. Additionally, crude heparins will have a wide range of pyrogenic contamination, depending upon their histories. One of the principal objects of this invention is, therefore, to provide a method for the purification of heparin solutions and other sulfated carbohydrates.

Another object of this invention is to provide a method for the removal of color from heparin solutions.

Another object of this invention is to provide a process for the removal of pyrogens from heparin solutions.

Another object of this invention is to provide a process for the simultaneous removal of color and pyrogens from heparin solutions.

Another object of this invention is to provide a process for the purification of heparin wherein the color is removed, pyrogens are decreased and the viscosity of the heparin solutions is decreased, all without any substantial loss in unit activity of the heparin.

Another object of this invention is to provide a method for the purification of heparin solutions which is relatively simple and utilizes relatively inexpensive and readily-available chemicals.

Other objects and advantages of this invention it is believed will be readily apparent from the following detailed description of preferred embodiments thereof.

Briefly, this invention includes within its scope the startling discovery that crude heparin solutions may be decolorized by subjecting the solutions to the action of certain oxidizing agents. The exact mechanisms by which such treatment accomplishes this entirely unexpected result are not entirely known at this time, but it is clear that many water-soluble oxidizing agents will act upon the components of the solution which cause the coloration, in such a manner as to facilitate their entire or partial removal, although specific oxidizing agents vary in their efficiency from the standpoints of color removal and yield of finished heparin. It has additionally been found that certain oxidizing agents having a standard oxidation-reduction potential of not higher than about −0.50 volt (referred to the hydrogen ion couple as zero and for unit activities at 25° C.) are particularly efficacious.

The following specific oxidizing agents, referred to as the anion where applicable, are within the scope of this invention: permanganate (as the potassium, sodium or other salt); bromine; bromate (as the potassium, sodium or other salt); perborate (as the sodium or other salt); persulfate (as the potassium, ammonium or other salt); chlorine, hypochlorite (as the calcium, sodium or other salt or as hypochlorous acid); chlorate (as the sodium, potassium or other salt); dichromate (as the sodium, potassium or other salt); chromate (as the sodium, potassium or other salt); iodate (as the sodium, potassium, ammonium or other salt); iodine; hypoiodite; perchlorate (as the sodium, potassium or other salt, or as perchloric acid); periodate (as the sodium, potassium or other salt); hypobromite (as the sodium, potassium or other salt or as the acid). Thus, the agents are selected from the group consisting of the halogens and water soluble salts containing the above-identified anions.

In carrying out the process of this invention a solution containing the oxidizing agent is added to the heparin solution to be purified. The pH of the resultant mixture may vary over a wide range, depending upon the characteristics of the specific oxidizing agent being utilized, but should be maintained in the approximate range of about 2 to about 10 in order to avoid damage to the heparin itself. The temperature conditions may also vary, from room temperature or below to as high as at least 70° C. for some oxidizing agents. The oxidizing agent is maintained on contact with the heparin solution for a sufficient period of time to permit the reaction to be accomplished, and the purified heparin is then separated from the solution. In some cases, depending upon the type of oxidizing agent utilized, the agent, such as permanganate, is reduced and precipitated and removed, followed by precipitation of the heparin. Other oxidizing agents, such as bromine for example, remain in solution and the heparin is precipitated therefrom without prior removal of the oxidizing agent.

The following specific examples are illustrative of the process of this invention, but it is to be understood that the invention is not to be limited thereto:

*Example 1*

A batch of 100,000,000 units of heparin sodium crude, having a unit activity of 100 units per mg., was dissolved in 10 liters of distilled water and the pH adjusted to 7.8 by adding 6 N sodium hydroxide. The temperature of the solution was raised to 40° C. and to the solution was added 100 grams of potassium permanganate (U.S.P.) dissolved in 1.5 liters of hot water (about 75° C.). No further heat was added after the initial heating of the heparin and permanganate solutions. The permanganate solution was added slowly with stirring over a period of about 1 hour. Stirring was continued for an additional ½ hour and the mixture allowed to stand for about 12 hours.

The clear supernatant was decanted off and the remaining slurry was centrifuged. The supernatant was combined with the decanted liquid, the cakes in the centrifuge bottles were washed twice with pyrogen-free water and these washings combined with the supernatant. These combined liquids were then filtered with suction using filter aid. The pH of the filtrate was adjusted to about 8.0 with 6 N HCl and sufficient sodium chloride was added to make a 1% by weight solution thereof.

The purified heparin was then precipitated from the solution by adding thereto 1 volume (about 15 liters) of acetone. The supernatant was decanted and the precipitate centrifuged. The isolated solid heparin was then dissolved in 7.5 liters of 1.0% sodium chloride solution and reprecipitated with 1 volume of acetone. Decantation and centrifugation gave the final, purified product. The yield was 78,000,000 units of heparin with a unit activity of 103 units per mg. The purified heparin was finished by redissolving in 2.5 liters of pyrogen-free water, removing the solvent by heating at 50° C. under vacuum, and then freeze-drying for 20 hours (−40° to −30° C.).

With some batches of crude heparin, additional treatment is necessary to remove all the pyrogens or color. In such cases, the process as above is carried out a second time, but utilizing only 10% as much potassium permanganate.

In carrying out the process of Example 1, from 1–30% by weight of potassium permanganate, based upon the weight of the crude heparin, may be used. Up to a 25% excess of permanganate may be used with no adverse effects, but any excess must be destroyed with a non-contaminating reducing agent such as formaldehyde or alcohol, giving rise to a larger cake to be washed and removed. The amount of permanganate is varied, depending upon the quality of the crude heparin used; the higher the degree of initial purity, the less permanganate is required. The temperature range is quite wide and may vary from about 20° C. to about 70° C. As is commonly the case in chemical reactions the process proceeds faster with moderate heating. Similarly, the pH may vary from about 6.5 to about 9.0.

The use of the saline solutions in precipitating the heparin is not absolutely essential, but is considered very important from the standpoint of product yield. The sodium chloride content may be as high as 5% when using alcohol as the precipitating medium, and as high as about 2% when acetone is used. In this connection, it will be understood by those skilled in the art that in addition to acetone and alcohol (i.e., methyl, ethyl, isopropyl and normal propyl) or mixtures thereof, any water miscible organic solvent in which heparin is insoluble may be used as the precipitating solvent. Other examples are ketones such as methyl ethyl ketone, Methyl Cellosolve, etc., and mixtures thereof.

It will be further understood that the product may be dried under a high vacuum at 50°–60° C., rather than utilizing the freeze-drying technique.

*Example 2*

A batch of 100,000,000 units of heparin sodium crude, having a unit activity of 100 units per mg., was dissolved in 8 liters of water. The pH was adjusted to 7.0 with 6 N NaOH and the temperature used was room temperature. To this solution was added 2.0 liters of saturated bromine water, the bromine water being added in several portions over the period of an hour. The resulting solution was stirred well for ½ hour and then allowed to stand overnight. Turbidity was removed by filtration with a filter aid and the pH adjusted to 8.0 with 6 N HCl. Sodium chloride was added to make a 1% NaCl solution and the heparin precipitated therefrom with 2 volumes of methyl alcohol. After decanting, centrifuging and redissolving in 8 liters of 1% sodium chloride solution, the heparin was reprecipitated with 2 volumes of methyl alcohol. The yield was 80,600,000 units of purified heparin having a unit activity of 102 units per mg.

In carrying out the process of Example 2, the pH may be varied between about 5.0 and about 8.5 and the temperature may go as high as about 50° C. The precipitating solvents referred to above in connection with Example 1 may be used in place of or in admixture with the methyl alcohol of Example 2.

While excellent yields of purified heparin are obtainable with the process of this invention, the yield in any specific case will be greatly influenced by the initial quality and purity of the crude heparin. In any event, there is no loss in unit activity, and in fact in some cases, as indicated above, the unit activity is increased. The method of the present invention is applicable to heparin which may be U.S.P. but which, for reasons of color or disadvantageous clinical aspects, as will be more fully discussed below, is susceptible to further purification by the process of the present invention. It is thus to be understood that a wide range of types of impurities of heparin may be treated by this process.

The color of crude heparin solutions varies greatly, but regardless of this, very marked changes in the color are obtained with the process of this invention. For example, a solution of crude heparin at 50 mg. per ml. had a reading of 0.115 at 660 mu in a Klett colorimeter. The same material, after treatment in accordance with the process of Example 1, was essentially the color of the blank, which was water. The solution of this treated material at 200 mg. per ml. had a reading of 0.008.

Insofar as pyrogenicity is concerned, the pyrogenic contamination of crude heparins varies widely, depending upon their history. The process of this invention results in substantial elimination of pyrogens, along with decolorization. Thus, the crude heparin referred to in the preceding paragraph caused an average temperature rise of 2.2° C. under the conditions of testing described in U.S.P. XIV, and after treatment the purified heparin caused a temperature rise of 0.2° C., well within the U.S.P. XIV requirements.

The process of this invention is also advantageous in that the viscosities of heparin solutions thus treated are appreciably lower than untreated solutions of the same concentrations. This is of value in the preparation of solutions, from the standpoint of ease of filtration, and also from the standpoint that the physician may use a smaller and less painful needle when giving injections of the purified heparin solutions.

Moreover, there are clinical indications that heparin treated in accordance with the process of the present invention is of improved clinical effectiveness in that it has been reported by clinicians that the heparin treated as described above gives no adverse clinical reactions on repeated use, whereas other heparins of U.S.P. grade have shown some reaction. There are also indications that the heparin produced by the process of this invention shows no elevation of serum transaminase upon I.M. use, whereas other heparins do show such an elevation. This would indicate muscle damage with such other heparins but no such damage with the use of the heparin produced in accordance with the present invention.

As indicated above, the process of the present invention applies generally to sulfated carbohydrates. In addition to heparin, this process has been found to be equally effective in the treatment of other sulfated carbohydrates such as starch sulfate, cellulose sulfate, pectic acid sulfate, mannuronic acid sulfate, arabic acid sulfate, chrondroitin sulfate and degraded derivatives of these compounds.

The application is a division of our copending application, Serial No. 621,217, filed November 9, 1956, on Method for Purifying Sulfated Carbohydrates, which in turn is a continuation-in-part of our application Serial No. 521,404, filed July 11, 1955, on Method for Purifying Heparin Solutions (both now abandoned).

Having fully described our invention, it is to be understood that we do not wish to be limited to the details set forth but our invention is of the full scope of the appended claims.

We claim:

1. A process of purifying sulfated carbohydrates which comprises treating an aqueous solution of a sulfated carbohydrate at a temperature not exceeding room temperature with a member selected from the group consisting of the halogens, the water soluble salts of an acid selected from the group consisting of permanganic, bromic, perboric, persulfuric, hypochlorous, chloric, dichromic, chromic, iodic, hypoiodous, perchloric, periodic and hypobromous acids, and acids selected from the group consisting of hypochlorous, hypobromous and perchloric acids, and separating a purified sulfated carbohydrate from the solution.

2. A process according to claim 1 wherein said sulfated carbohydrate is heparin.

3. A process of purifying heparin which comprises treating an aqueous solution of heparin with a water soluble salt of permanganic acid at a temperature not exceeding room temperature and separating a purified heparin from the solution.

4. A process of purifying heparin which comprises treating an aqueous solution of heparin with potassium permanganate at room temperature, and at a pH between about 6.5 and about 9.0 and separating purified heparin from the solution.

5. A process of purifying heparin which comprises treating an aqueous solution of heparin with bromine at a temperature of between 20° C. and 50° C. and separating purified heparin from the solution.

References Cited in the file of this patent

UNITED STATES PATENTS 2,830,931    Burfoot _____ Apr. 15, 1958